G. N. BRUNKER.
SEAT.
APPLICATION FILED FEB. 4, 1919.

1,315,086.

Patented Sept. 2, 1919.
3 SHEETS—SHEET 1.

Witness
E. A. Ruppert.

Inventor
G. N. Brunker
By Victor J. Evans
Attorney

G. N. BRUNKER.
SEAT.
APPLICATION FILED FEB. 4, 1919.

1,315,086.

Patented Sept. 2, 1919.
3 SHEETS—SHEET 2.

Witness
E. R. Ruppert

Inventor
G. N. Brunker
By Victor J. Evans
Attorney

G. N. BRUNKER.
SEAT.
APPLICATION FILED FEB. 4, 1919.
1,315,086.
Patented Sept. 2, 1919.
3 SHEETS—SHEET 3.
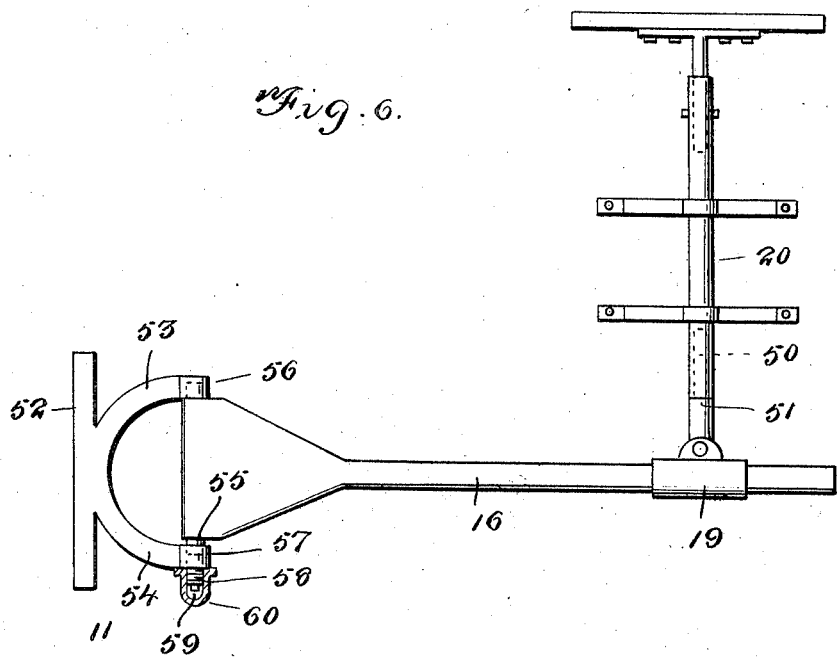
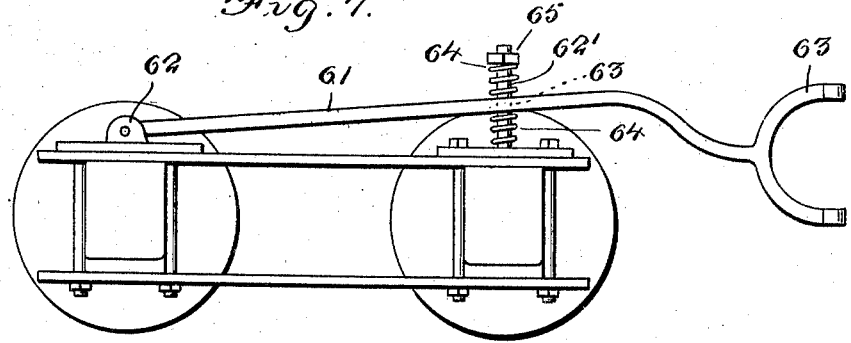
WITNESSES:
INVENTOR
G. N. Brunker
BY
ATTORNEY

UNITED STATES PATENT OFFICE.

GEORGE N. BRUNKER, OF POCATELLO, IDAHO.

SEAT.

1,315,086.  Specification of Letters Patent.  Patented Sept. 2, 1919.

Application filed February 4, 1919. Serial No. 274,954.

*To all whom it may concern:*

Be it known that I, GEORGE N. BRUNKER, a citizen of the United States, residing at Pocatello, in the county of Bannock and State of Idaho, have invented new and useful Improvements in Seats, of which the following is a specification.

This invention relates to seats, the object being to provide a seat especially adapted for the use of locomotive engineers and firemen.

The primary object of the invention is the provision of a seat of this character which is supported by the water tank or tender of the locomotive and arranged within the locomotive cab, so that the engineer and fireman will not be subjected to the swinging or other disagreeable movement of the locomotive.

With the above and other objects in view, the invention includes means for securing the seat to the tender in a manner to permit of relative lateral movement and of providing guiding means positioned upon the locomotive while the construction of the seat is such as to take up both vertical and horizontal shocks and jars.

The invention further consists of the following novel details of construction, combination and arrangement of parts, to be hereinafter more fully described and illustrated in the accompanying drawings:—

In the drawings:—

Fig. 6 is a view of a modified means for supporting the seat.

Fig. 7 is a view of a still further modified form showing the supporting means secured upon the truck of the tender or tank.

Referring more specifically to the drawings, wherein like characters of reference denote corresponding parts throughout the several views, the cab of the locomotive is indicated at 10 and a portion of the tender at 11.

Figure 1:
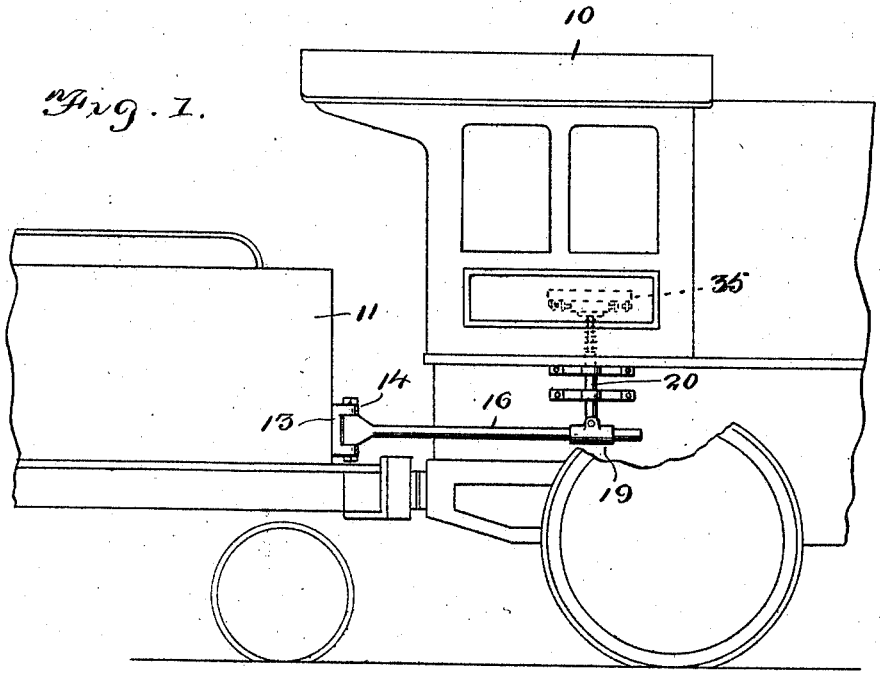
Figure 1 is a side elevation illustrating the application of the invention, a fragmentary portion of the locomotive cab and tender being shown.
Figure 4:
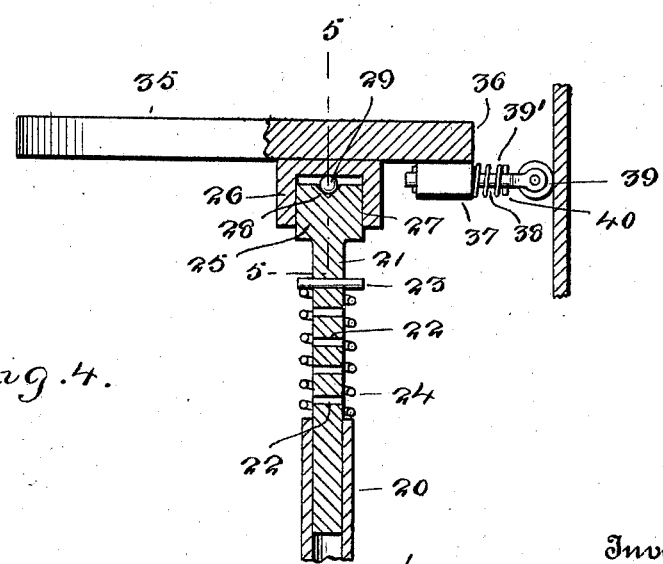
Fig. 4 is a detail sectional view on the line 4—4 of Fig. 2.
Figure 2:
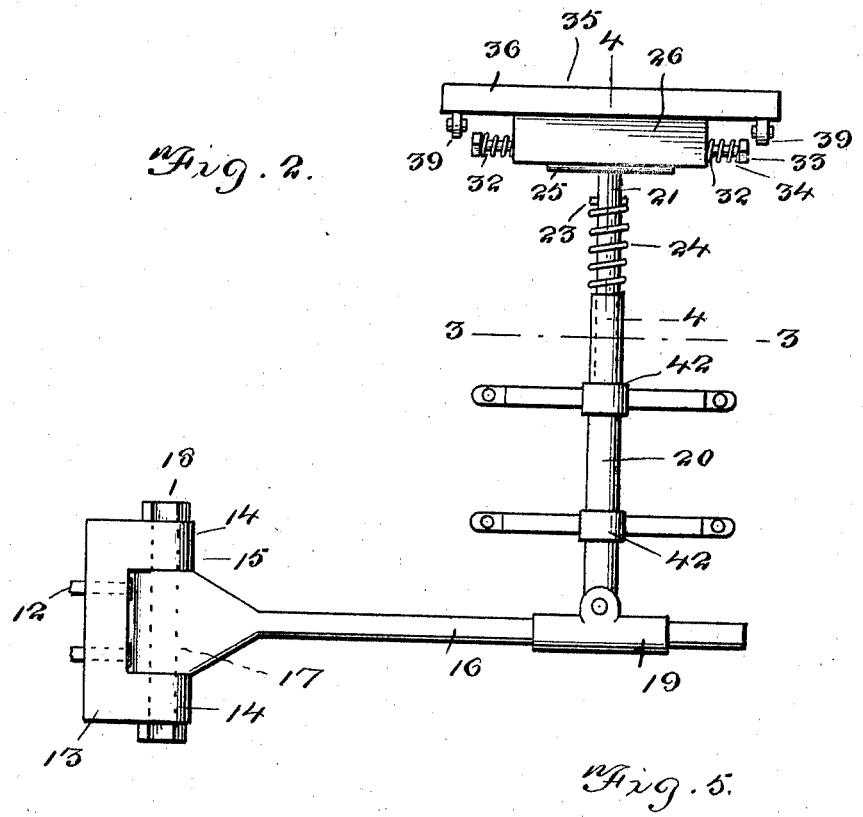
Fig. 2 is an enlarged elevation of the invention detached.
Figure 3:
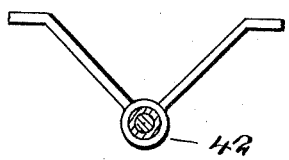
Fig. 3 is a horizontal sectional view on the line 3—3 of Fig. 2.
Figure 5:
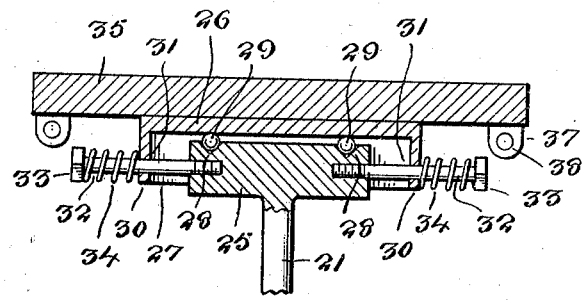
Fig. 5 is a sectional view on the line 5—5 of Fig. 4 and illustrating the sliding connection of the seat with the standard.

Secured to a convenient point upon the tender 11 through the medium of bolts or fastening devices 12, is a bracket 13, the said bracket including spaced ears 14 which are provided with alined openings 15. Pivotally mounted between the ears 14 is a horizontally disposed supporting arm 16, the latter being provided with an opening 17, through one end thereof for the reception of a pivot pin or bolt 18, which passes through the openings 15 in the ears 14. This permits of a horizontally swinging movement of the arm 16 upon the tender.

The arm 16 is circular in cross section and slidably mounted upon the arm is a sleeve 19 which carries a standard 20, the latter being also circular in cross section and hollow for a portion of its length.

Mounted for vertical and rotary movement within the standard 20, is a post 21, which is provided with spaced openings 22 for the reception of the pin 23 and positioned between the end and the upper edge of the standard 20 and surrounding said post is a coiled spring 24, the purpose being to yieldingly mount the post within the standard.

The upper end of the post 21 is provided with a cross bar or head 25, which is adapted to slidably receive the slot 26, which is provided with a groove 27 for that purpose. The head 25 is formed with seats 28 for the reception of anti-friction devices 29, the block 26 being supported upon these devices. The groove 27 within the block 26 terminates short of the end of the latter to provide end walls 30 and these walls have formed therein notches 31, which are adapted to take over the pins 32 projecting from each end of the head 25. Surrounding the pin 32 and positioned between the end walls 30 and a nut 33 mounted upon the extremity of the pins, are coiled springs 34, the movement of the block 26 with respect to the edge 25 being thus yieldingly limited.

Secured to the block 26 is a seat 35, the latter being semi-elliptical in form, so that its straight edge 36 is disposed substantially parallel with the inner wall of the locomotive cab, within which the seat is positioned. Located upon the bottom of the seat near each end thereof, is a socket 37, which is adapted to receive an arm 38, the latter carrying at its outer end a rotor 39. This rotor is adapted to bear against the inner wall of the locomotive cab 10, so that the vertical movement of the seat 35 within the cab will be parallel to this wall. Surrounding the arm 38 is a coiled spring 39, one end of which is positioned against a pin 40 extending through the arm and the opposite end against the surrounding edge of the socket 37.

The arm 16 which as previously described is pivotally mounted upon the locomotive tender 11, extends forwardly and has its front end positioned under the locomotive cab 10, while the standard 20 extends upwardly through the floor of the cab to properly position the seat 35 for the locomotive and fireman. Beside the standard 20 in its vertical movement with respect to the locomotive, there is provided guiding brackets which consist of a sleeve 42, which is carried by inclined arms 43, having one end secured to the locomotive beneath the cab. This permits of a free sliding movement of the standard 20 with respect to the locomotive, while the pivotal mounting of the arm 16 allows more relative lateral movement between the locomotive and tender. The sleeve 19 permits of a sliding and pivotal movement of the standard 20 with respect to the arm 16, while the mounting of the seat within the said standard provides a cushioning means and permits of relative rotary movement, the seat being held against rotary movement with respect to the cab through the medium of the rollers 39 and the arm 38, thus compensating all movements between the cab and the tender. Horizontal shock or jar is taken up by yielding connection of the seat with the cross head 25.

In the form of the invention shown in Fig. 6, the seat, seat post and standard are substantially the same as that shown in the previously described form. Instead of securing the standard directly to the sleeve 19, the said sleeve has pivotally secured thereto a short arm 50, which is adapted to be received within the lower end of the standard 20, the latter resting upon a shoulder 51 formed on the arm. The sleeve 19 is mounted for sliding movement on the arm 16, and the latter is mounted for horizontal swinging movement in the bracket 52, which is secured upon the tender 11, by bolts or other fastening devices. The bracket 52 is provided with outwardly extending arms 53 and 54, so as to provide spaced bearings for the reception of the inner end of the arms 16. This inner end is formed with an opening for the reception of a pivot pin 55, one end of which enters a bearing opening 56 in the arm 53 and the other end a bearing opening 57 in the end of the arm 54. This latter bearing opening is threaded in its lower end for the reception of the threaded plug 58, which may be adjusted against the end of the pivot pin 55 to provide a thrust bearing. The threaded plug 58 projects beyond the bearing 57 and is provided with a rectangular end 59, for the reception of a wrench, or other tool, for the purpose of adjustment. A cap 60 may be threaded over the projecting end of the plug 58.

In Fig. 7 the device is shown as supported upon a tank truck, instead of a tank or tank frame. To accomplish this there is provided an arm 61, one end of which is pivotally mounted upon the truck, as shown at 62. The opposite end of this arm is forked, as at 63, and the forked ends are formed with bearings similar to the bearings formerly described in connection with the construction shown in Fig. 6. To compensate for the spring action imparted by mounting the seat upon the tank or tank frame, the outer end of the arm 63 is yieldingly supported upon the end of the truck and guided thereon through the medium of the standard 62', which extends vertically from the top of the truck and operates in the opening 63 in the arm 61. Mounted upon the standard 62' and the arm 61 are springs 64. A nut 65 secured upon the upper end of the standard serves as a bearing or abutment for the upper end of the upper spring.

The invention is susceptible of various changes in its form, proportions and minor details of construction; for example, the bracket 13 may be connected to either the water tank, the water tank truck or the water tank frame. Various other changes may also be made without departing from the spirit or sacrificing any of the advantages of the invention, and the right is herein reserved to make such changes as fall within the scope of the appended claims.

I claim:—

1. The combination with a vehicle, of a seat located therein and means for supporting the seat upon a second vehicle coupled to the first mentioned vehicle.

2. The combination with a locomoitve, of a seat located in the cab thereof and means for supporting the seat upon the locomotive tender.

3. The combination with a locomotive, of a seat located within the cab thereof and means for supporting the seat upon the locomotive tender in a manner to permit of relative lateral movement of the locomotive and tender.

4. The combination with a locomotive, of a seat located within the cab thereof and means for pivotally supporting the seat upon the locomotive tender in a manner to permit of relative lateral movement of the seat and tender.

5. The combination with a locomotive, of a seat located within the cab thereof and a horizontal supporting arm mounted upon the tender for horizontal swinging movement, a standard slidable upon said arm and means for yieldingly mounting the seat upon said standard.

6. The combination with a locomotive, a seat located within the car cab thereof, a horizontal supporting arm mounted upon the locomotive tender for horizontal swinging movement, a standard slidable upon said arm and means for adjustably mounting the seat upon the standard.

7. The combination with a locomotive, of a seat located within the cab thereof, a horizontal supporting arm mounted within the locomotive tender for horizontal swinging movement, a standard slidable upon said arm, guiding means connecting the standard with the locomotive and means for yieldingly mounting the seat upon the standard.

8. The combination with a locomotive, of a seat located within the cab thereof, a horizontal supporting arm mounted upon the locomotive tender for horizontal swinging movement, a standard slidably and rotatably mounted upon said arm, means for yieldingly mounting the seat upon the standard and means for preventing rotation of the seat in respect to the cab.

9. The combination with a locomotive, of a seat located within the cab thereof, a horizontal supporting arm, mounted upon the locomotive tender for horizontal swinging movement, a standard slidably and rotatably mounted upon said arm, means for yieldingly mounting means for preventing rotation of the seat with respect to the cab.

In testimony whereof I affix my signature.

GEORGE N. BRUNKER.

Copies of this patent may be obtained for five cents each, by addressing the "Commissioner of Patents, Washington, D. C."